United States Patent
Persson

(10) Patent No.: US 10,207,692 B2
(45) Date of Patent: Feb. 19, 2019

(54) PARKING BRAKE ARRANGEMENT

(71) Applicant: FAIVELEY TRANSPORT NORDIC AB, Landskrona (SE)

(72) Inventor: Tobias Persson, Dösjebro (SE)

(73) Assignee: FAIVELEY TRANSPORT NORDIC AB, Landskrona (SE)

(*) Notice: Subject to any disclaimer, the term of this patent is extended or adjusted under 35 U.S.C. 154(b) by 0 days.

(21) Appl. No.: 15/554,625

(22) PCT Filed: Mar. 16, 2016

(86) PCT No.: PCT/EP2016/055698
§ 371 (c)(1),
(2) Date: Aug. 30, 2017

(87) PCT Pub. No.: WO2016/146690
PCT Pub. Date: Sep. 22, 2016

(65) Prior Publication Data
US 2018/0065608 A1  Mar. 8, 2018

(30) Foreign Application Priority Data
Mar. 16, 2015  (SE) ..................... 1550311

(51) Int. Cl.
*F16D 65/18* (2006.01)
*B60T 13/04* (2006.01)
(Continued)

(52) U.S. Cl.
CPC ............ *B60T 13/04* (2013.01); *B60T 13/741* (2013.01); *F16D 55/226* (2013.01);
(Continued)

(58) Field of Classification Search
CPC ........ F16D 65/18; F16D 65/183; F16D 55/22; B60T 13/04; B60T 13/74; B60T 13/741
(Continued)

(56) References Cited

U.S. PATENT DOCUMENTS 4,334,711 A  6/1982  Mazur et al.
4,953,669 A * 9/1990  Severinsson ............ B60T 13/04
188/158

(Continued)

FOREIGN PATENT DOCUMENTS

CN  101774374 A  7/2010
CN  103213597 A  7/2013
(Continued)

OTHER PUBLICATIONS

International Search Report and Written Opinion for PCT/EP2016/055698, dated Jun. 13, 2016.
(Continued)

*Primary Examiner* — Christopher P Schwartz
(74) *Attorney, Agent, or Firm* — Merchant & Gould P.C.

(57) ABSTRACT

A parking brake arrangement for a brake unit—also having a service brake actuator—has in a housing (4) a clock spring (10) for exercising a rotary motion at will on a parking brake gear wheel (8) in drive connection with a device (5-7) for delivering brake force from the brake unit (1). The arrangement has two axially movable control sleeves (15, 16) in drive connection with the clock spring (10). The control sleeves form clutches (8', 15 and 12, 16, respectively) with the parking brake gear wheel (8) and the housing (4), respectively. There are means (13, 18-21) for controlling the axial movements of the two control sleeves and the engagement of the two clutches in such a way that either one of them is always in engagement.

14 Claims, 2 Drawing Sheets

(51) Int. Cl.
*B60T 13/74* (2006.01)
*F16D 55/226* (2006.01)
*F16D 121/14* (2012.01)
*F16D 125/40* (2012.01)
*F16D 125/58* (2012.01)

(52) U.S. Cl.
CPC ........ *F16D 65/183* (2013.01); *F16D 2121/14* (2013.01); *F16D 2125/40* (2013.01); *F16D 2125/582* (2013.01)

(58) Field of Classification Search
USPC .......................................... 188/158–164, 171
See application file for complete search history.

(56) References Cited

U.S. PATENT DOCUMENTS

| 5,388,674 | A | * | 2/1995 | Severinsson | B60T 13/743 188/162 |
| 6,279,691 | B1 | * | 8/2001 | Takahashi | F16D 65/18 188/1.11 E |
| 6,722,477 | B1 | | 4/2004 | Wolfsteiner et al. | |
| 6,913,123 | B2 | * | 7/2005 | Severinsson | B60T 1/065 188/156 |
| 2008/0261773 | A1 | * | 10/2008 | Cao | F16D 28/00 477/199 |
| 2010/0176652 | A1 | * | 7/2010 | Arakawa | B60T 1/10 303/10 |
| 2017/0370433 | A1 | * | 12/2017 | Chelaidite | F16D 55/22 |

FOREIGN PATENT DOCUMENTS

| DE | 8705655 UI | | 8/1988 | | |
| DE | 19617796 A1 | | 11/1997 | | |
| DE | 19945701 A1 | | 4/2001 | | |
| GB | 2312717 A | | 11/1997 | | |
| JP | 2004-520546 A | | 7/2004 | | |
| WO | WO 92/17714 A1 | | 10/1992 | | |
| WO | WO 94/24453 | * | 10/1994 | ............. | B60T 13/74 |
| WO | WO 02/49892 A1 | | 6/2002 | | |
| WO | WO 2004/031607 A1 | | 4/2004 | | |

OTHER PUBLICATIONS

Office Action and Search Report for Chinese Patent Application No. 201680013116.6, dated Oct. 29, 2018 with an English translation.

* cited by examiner

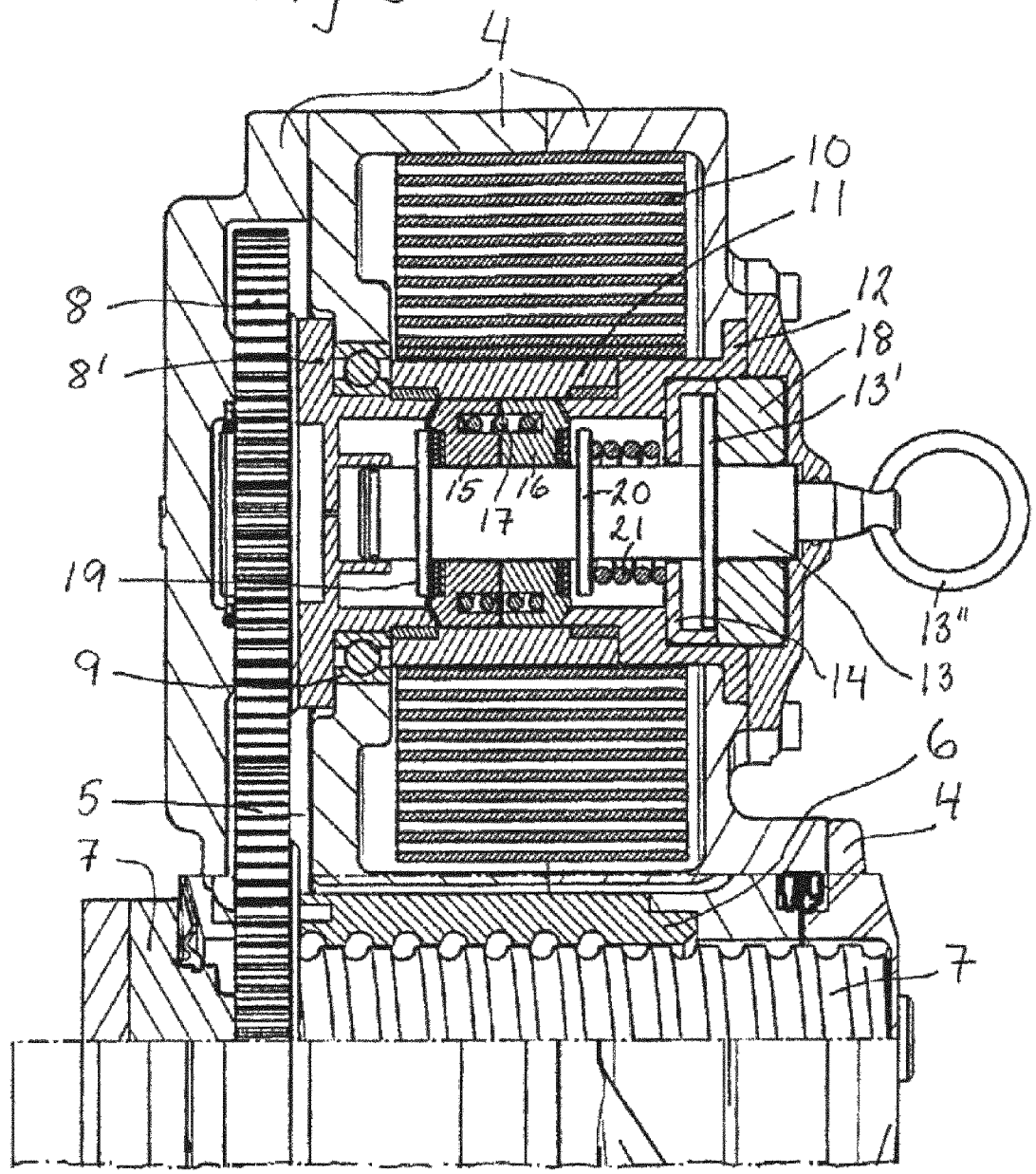

PARKING BRAKE ARRANGEMENT

This application is a National Stage Application of PCT/EP2016/055698, filed 16 Mar. 2016, which claims benefit of Swedish Patent Application No. 1550311-3, filed 16 Mar. 2015, which applications are incorporated herein by reference. To the extent appropriate, a claim of priority is made to each of the above disclosed applications.

TECHNICAL FIELD

The present invention relates to a parking brake arrangement for a brake unit—also having a service brake actuator—comprising in a housing a spring means for exercising a rotary motion at will on a parking brake gear wheel in drive connection with a device for delivering brake force from the brake unit. The invention also concerns a method for applying and releasing a parking brake, as well as a vehicle comprising a parking brake arrangement.

BACKGROUND

It is a tendency in the art of braking vehicles to employ a rotary electric motor for supplying a service brake force. Behind this tendency there is a desire to use electricity for the control and actuation of different arrangements onboard the vehicle, thereby among other things obviating the need for pneumatic and/or hydraulic systems.

In such an electric service brake actuator there should normally be a device for converting the rotary motion from the electric motor to a translational movement suitable for the application of a brake pad or a brake shoe against a brake disc or a wheel rim or brake drum of the vehicle. Such a device can for example be a so-called ball screw (as is the case in a practical embodiment revealed herein).

The service braking is thus performed by means of electric power. In the possible absence of electric power normal service braking is not possible, and an emergency braking is desirable. Also, parking braking shall be performed by another arrangement than the service brake actuator.

The teachings herein are concerned with such a parking and emergency brake arrangement.

It is already known to employ a powerful clock spring for the purpose of delivering a rotary parking and emergency brake force through the above mentioned device for converting a rotary motion into a translational movement.

DE19945701A1 relates to a brake actuator, especially a brake actuator for rail vehicle brake calipers for a disc brake. The brake actuator comprises a service brake unit with an electromotive drive system for clamping and releasing the brake, a safety brake unit with a pre-loaded spring device for clamping the brake, and a brake spindle for converting the movements of the electromotive drive system into a translatory movement for activating a brake clamping mechanism; especially for activating brake calipers. The pre-loaded spring device and the brake spindle are positioned coaxially in relation to each other and are mechanically connected in series. The spring device comprises a coil spring that is arranged to directly engage the brake clamping mechanism. This calls for a large force being translated by the spring.

DE19617796A1 describes an electromechanical disc brake actuation device which has a spindle piston, loaded by an energy-storage spring coupled to a clamping piston for delivering the actuating force or stroke and engaging an axially non-displaceable female part by means of a non-self-locking adjusting thread. The spindle piston, under the force of the spring, can be screwed in the direction of actuation under electrical monitoring by means of a stepping motor, or a locking mechanism or similar, and the female part can be rotated to bring about the opposite direction of rotation of the spindle piston by an electric motor and a self-locking worm gearing. This enables the setting of relative rotations between the parts of the thread and hence rapid and controllable braking. The clamping piston includes an integrated wear adjustment device. The energy storing spring in this DE document is also a spring acting directly onto the braking means, and hence requires a large force spring, elbeit with a very limited motion.

CN103213597A relates to an electromagnetic controllable mechanical parking brake device which comprises action arms, an action arm installation seat, cylindrical compression springs, electromagnetic iron components and abrasion pieces. Two action arms are respectively connected on an upper end and a lower end of the action arm installation seat in a rotation mode, the cylindrical compression springs are arranged between the two action arms, two ends of each cylindrical compression spring are connected with the action arms on the upper side and the lower side respectively, the electromagnetic iron components are arranged inside the cylindrical compression springs and connected with the action arms on the upper side and the lower side, and two abrasion pieces are respectively arranged at the other end of each action arm.

Also in this CN document, the spring acts in an axial direction, and although the spring acts on levers connected to braking blocks, the force required by the spring is large. Compared to other prior art, electricity amount of the electromagnetic iron components is controlled to control frictional force among the abrasion pieces and a steel rail so as to achieve braking or parking of a vehicle, the abrasion pieces are compressed on the steel rail, most thermal load is born by the steel rail, the position of the vehicle is continuously moved, heat generated by the braking is rapidly dissipated on the steel rail, and the electromagnetic controllable mechanical brake parking device is suitable for being used for continuously-implemented brake of the vehicle on long-distance downhill.

SUMMARY

An object of the invention is to mitigate or eliminate the drawbacks discussed above and to accomplish a safe parking and emergency braking, when electric power is lost or when parking braking is desired. Another object of the invention is to accomplish such a braking without any power interruption or energy loss for example in the form of slip in a clutch or the like. Still another object is to accomplish a parking braking arrangement that is as lightweight, sturdy and cheap as possible.

The above and other objects, which will appear from the following description, have now been achieved by a concept set forth in the appended independent claims; preferred embodiments being defined in the related dependent claims.

In one aspect, there is provided a parking brake arrangement which is of the type set forth by way of introduction and which comprises two axially movable control sleeves in drive connection with the spring means and forming clutches with the parking brake gear wheel and the housing, respectively. The arrangement further comprises means for controlling the axial movements of the two control sleeves and the engagement of the two clutches in such a way that either one of them is always in engagement. A release rod is provided, which comprises two control rings for engagement with either one of the control sleeves, and which is axially movable in the control sleeves under the action in a parking brake release direction of a fixed electromagnet and in the opposite direction by a return spring. The release rod is provided with a magnetic anchor disc to be attracted by the electromagnet when energized, for controlling the axial movements of the two control sleeves. The two control sleeves are biased apart by a spring such that either one of them is always in engagement.

When the clutch to the housing is in engagement, no rotary motion created by the spring means can occur, whereas rotary motion is supplied to the parking brake gear wheel, when the clutch thereto is in engagement. As either of the two clutches are always in engagement, no power interruption or slip can occur. The design is in fact such in a practical embodiment that both clutches are in engagement for a short while in the mentioned transition.

In a practical embodiment, a release rod provided with two control rings for engagement with either one of the control sleeves, is axially movable in the control sleeves under the action in a parking brake release direction of a fixed electromagnet and in the opposite direction by a return spring.

When the electromagnet is energized, the clutch to the housing is in engagement immobilizing the spring means, whereas a de-energized electromagnet means that the clutch to the parking brake gear wheel gets into engagement (slightly before the clutch to the housing disengages) under the action of the return spring. The control over the clutches is performed by the control rings engaging either one of the control sleeves.

In a practical embodiment, the release rod is provided with a magnetic anchor disc to be attracted by the electromagnet when energized.

In order to facilitate a manual release of the parking brake, the release rod is provided with a release ring at an end extending out of the housing.

The parking brake arrangement may be configured to, by positioning the release rod in either of its axial end positions, engage one of the clutches and open the other clutch, and to engage both clutches when the release rod is in a position between its respective end positions.

The clutches may comprise tooth clutches in order to secure their engagements.

In order to secure a correct operation the two control sleeves are biased apart by a spring.

In a practical case, the inner end of the spring means is attached to a spring sleeve, in which the control sleeves are axially movable. The control sleeves rotate together with the spring sleeve.

In an embodiment, the spring means comprises a clock spring. As the spring means is intended to be tensioned such that it may provide a rotational torque to components of the brake arrangement, a clock spring is well suited for the task.

In an aspect, there is provided a vehicle—in particular a rail vehicle—which comprises a parking brake arrangement according to the teachings herein.

In a further aspect, there is provided a method for applying and releasing a parking brake arrangement of the teachings herein, in which the parking brake is applied by axially positioning the control sleeves by the means for controlling the axial movements of the two control sleeves such that the clutch with the parking brake gear wheel is engaged and the clutch with the housing is open. Thereby energy is stored in the spring means allowed to apply the parking brake. The parking brake is released by the service brake actuator providing an parking brake releasing rotation of the gear wheel which winds up the spring means such that energy is stored in the spring means, and then axially positioning the control sleeves such that the clutch with the parking brake gear wheel is open and the clutch with the housing is engaged.

To reduce the risk that energy stored in the spring means is lost during axial movement of the means for controlling the axial movements of the two control sleeves, both clutches are engaged before either of the clutches is opened. This occurs irrespective of the direction of the axial movement of the means for controlling the axial movements of the two control sleeves.

In a practical case, the means for controlling the axial movements of the two control sleeves is axially movable under the action in a parking brake release direction of a fixed electromagnet and in the opposite direction by a return spring.

BRIEF DESCRIPTION OF THE DRAWINGS

The teachings herein will be described in further detail below with reference to the accompanying drawings, in which FIG. 3 is an enlargement of the sectioned portion of FIG. 2.

DETAILED DESCRIPTION

Figure 1:
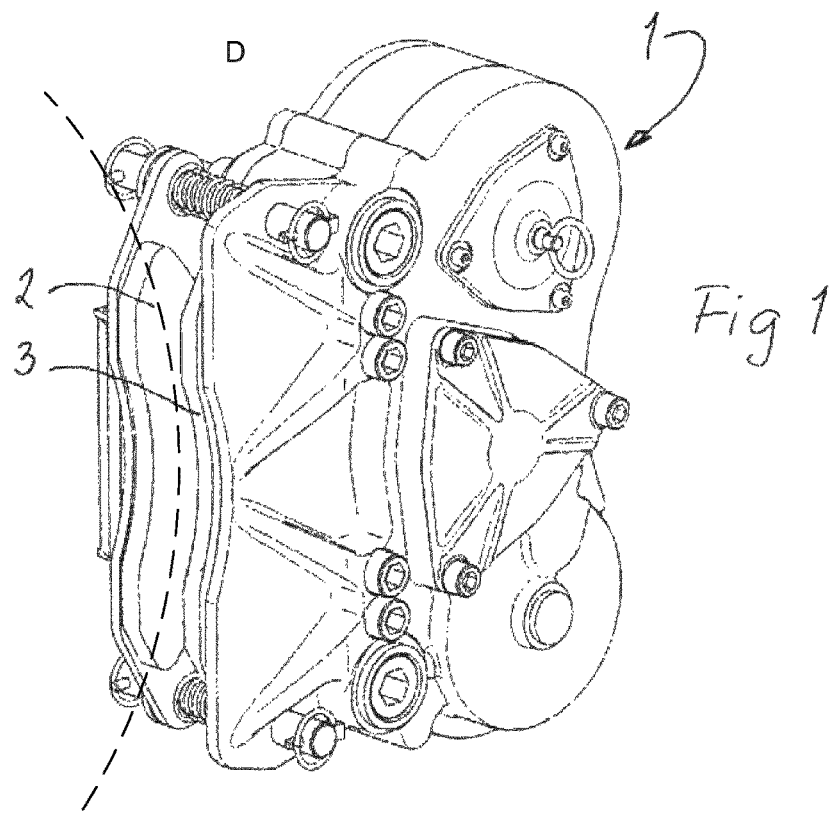
FIG. 1 is an isometric view of a disc brake unit containing a parking brake arrangement.

FIG. 1 shows a disc brake unit 1 for a rail vehicle (not shown). The unit 1 is to be mounted to the undercarriage of the vehicle in the vicinity of a brake disc on a wheel axle or the like on the vehicle. The teachings herein will be described in its use on a rail vehicle, but use on a road vehicle is not excluded.

The brake unit 1 is to be mounted astraddle of a brake disc D (shown in dotted lines in FIG. 1), so that two brake pads 2, 3 may be brought into braking engagement with the brake disc D by a brake force generated within the brake unit 1. In the present case this brake force may either be a service brake force or a parking brake force.

The means for transferring the brake force generated in the brake unit to a clamping force from the two brake pads 2, 3 are known in the art and will not be further described, except to the extent necessary for an understanding of the concept set forth herein.

Figure 2:
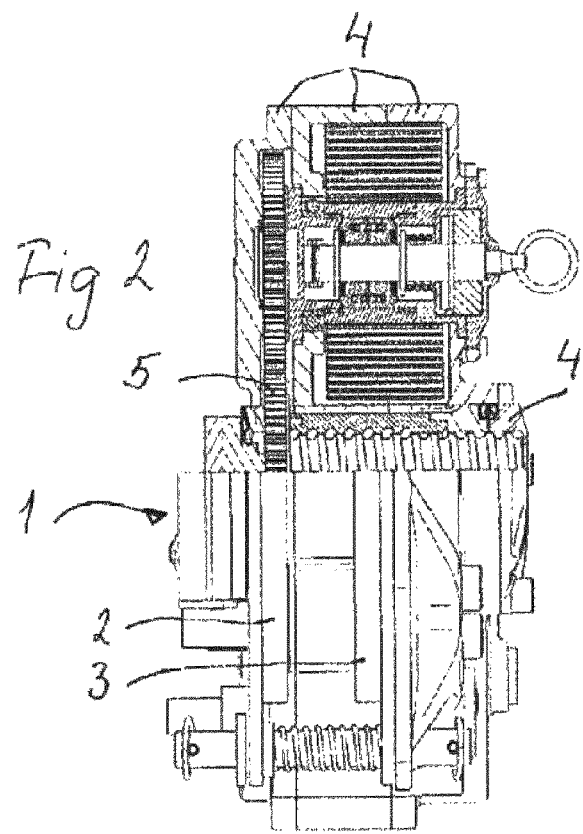
FIG. 2 is a side view of this disc brake unit with the parking brake arrangement shown in section.

The disc brake unit 1—having a housing 4 comprised of several parts—contains in its lower portion in FIG. 2 (that is not shown in section) a service brake actuator, which is per se known and as its brake force generating element has an electric rotary motor provided with a reduction gearing. The brake force from the electric motor of the service brake actuator is delivered via a drive gear wheel 5 rotationally journalled in the housing 4.

Further reference is now made to FIG. 3.

The drive gear wheel 5 is connected to a drive sleeve 6 which is also rotationally journalled in the housing 4. The drive sleeve 6 forms—together with a non-rotational drive spindle 7, coaxially arranged within the drive sleeve, and appropriate ball means—a so-called ball screw. The spindle 7 extends through the open center of the drive gear wheel 5 and is ended by a push rod 7', which is connected to known means for transferring a linear movement to the left of the spindle 7 and thus the push rod T to a brake force applying movement of the brake pads 2, 3.

The teachings herein are concerned with a parking brake arrangement, shown in the sectioned portion of FIG. 3.

A parking brake gear wheel 8 is in gear engagement with the drive gear wheel 5. It is provided with a gear wheel sleeve 8' journalled in the housing 4 by means of a radial bearing 9.

The power source for selectively driving the parking brake gear wheel 8 for parking braking is a powerful spring means 10 having its outer end in permanent engagement with the housing 4 and its inner end in permanent engagement with a spring sleeve 11. This spring sleeve 11 is rotationally journaled on the gear wheel sleeve 8' as well as on a support sleeve 12 attached in the housing 4. The spring means 10 is adapted to be tensioned to provide a rotational torque to the spring sleeve 11, indirectly driving the parking brake gear wheel 8. A preferred example of a spring means suited for such a task is a clock spring 10.

Centrally located in the spring means 10 is an axially movable release rod 13, guided by the gear wheel sleeve 8' and a rod cup 14 in the support sleeve 12.

Two control sleeves 15, 16 are rotationally arranged on the release rod 13 between the gear wheel sleeve 8' and the support sleeve 12. These two control sleeves 15, 16 are axially movable in relation to the spring sleeve 11 but are in drive engagement therewith. Each of them forms a tooth clutch with the gear wheel sleeve 8' and the support sleeve 12, respectively, these clutches being called a left clutch 8'-15 and a right clutch 12-16, respectively. The two control sleeves 15, 16 together are axially shorter than the distance between the gear wheel sleeve 8' and the support sleeve 12 and are biased apart by means of an axial compression spring 17 in a suitably shaped space therein.

The release rod 13 is provided with a magnetic anchor disc 13' in the rod cup 14 in the vicinity of a ring-shaped electromagnet 18 in the housing 4 around the release rod 13. Furthermore, the release rod 13 is provided with two control rings 19 and 20 to the left and to the right, respectively, of the two control sleeves 15, 16. A return spring 21 of compression-type is arranged between the rod cup 14 and the right control ring 20 for biasing the release rod 13 to the left in the drawing.

The release rod 13 with its anchor disc 13' and its two control rings 19, 20, the return spring 21 and the electromagnet 18 can collectively be called "means for controlling the axial movements of the two control sleeves".

The arrangement is shown in FIG. 3 with the spring means 10 tensioned for later parking brake action and with the electromagnet 18 energized, so that the anchor disc 13' and thus the release rod 13 is held to the right in the drawing against the bias of the return spring 21. The left clutch 8'-15 is disengaged, so that the parking brake gear wheel 8 is free to rotate, allowing normal service brake operation of the not disclosed service brake. The right clutch 12-16 is engaged, so that rotation of the spring sleeve 11 under the action of the spring means 10 is prevented.

The following description starts from this shown position.

If there is a voltage drop to the electromagnet 18, indicating that a parking brake application is desired or that an emergency braking is needed (because the electric service brake becomes non-operational), the release rod 13 will move to the left in the drawing under the bias from the return spring 21. Due to the geometry, both the right clutch 12-16 and the left clutch 8'-15 are in engagement for a short while, before the right clutch 12-16 becomes unengaged. Now the force from the spring means 10 can be transmitted via the left clutch 8'-15 and the gear wheel sleeve 8' to the gear wheel 8 and further on to the ball screw 6, 7. Parking or emergency braking is performed under the action of the spring means 10.

Due to the working sequence of the two clutches 8'-15 and 12-16 and the lack of slip therein, no energy from the spring means 10 is lost.

After a parking or emergency brake application, the spring means 10 can be tensioned again by the service brake actuator via the gear wheel 8, the gear wheel sleeve 8', the left clutch 8'-15, the control sleeves 15, 16 and the spring sleeve 11; provided that the electromagnet 18 remains non-energized until the spring means 10 is tensioned to the desired extent.

The release rod 13 is provided with a release ring 13" at its end extending out of the housing 4 for enabling a manual release of the parking brake arrangement at will.

The invention claimed is:

1. A parking brake arrangement for a brake unit having a service brake actuator, said parking brake arrangement comprising:
   a housing;
   a spring means for exercising a rotary motion at will on a parking brake gear wheel in drive connection with a device for delivering brake force from the brake unit;
   two axially movable control sleeves in drive connection with the spring means and forming clutches with the parking brake gear wheel and the housing, respectively; and
   means for controlling the axial movements of the two control sleeves and the engagement of the two clutches in such a way that either one of them is always in engagement.

2. The parking brake arrangement according to claim 1, wherein a release rod, provided with two control rings for engagement with either one of the control sleeves, is axially movable in the two control sleeves under the action in a parking brake release direction of a fixed electromagnet and in the opposite direction by a return spring.

3. The parking brake arrangement according to claim 2, wherein the release rod is provided with a magnetic anchor disc to be attracted by the electromagnet when energized.

4. The parking brake arrangement according to claim 2, wherein the release rod is provided with a release ring at an end extending out of the housing.

5. The parking brake arrangement according to claim 2, wherein the parking brake arrangement is configured to, by positioning the release rod in either of its axial end positions, engage one of the clutches and open the other clutch, and to engage both clutches when the release rod is in a position between its respective end positions.

6. The parking brake arrangement according to claim 1, wherein said clutches comprise tooth clutches.

7. The parking brake arrangement according to claim 1, wherein the two control sleeves are biased apart by a spring.

8. The parking brake arrangement according to claim 1, wherein the inner end of the spring means is attached to a spring sleeve, in which the control sleeves are axially movable.

9. The parking brake arrangement according to claim 1, wherein the spring means comprises a clock spring.

10. A method for applying and releasing a parking brake arrangement for a brake unit having a service brake actuator, said parking brake arrangement comprising:
    a housing;

a spring means for exercising a rotary motion at will on a parking brake gear wheel in drive connection with a device for delivering brake force from the brake unit;

two axially movable control sleeves in drive connection with the spring means and forming clutches with the parking brake gear wheel and the housing, respectively; and means for controlling the axial movements of the two control sleeves and the engagement of the two clutches in such a way that either one of them is always in engagement;

the method comprising:

applying the parking brake arrangement by axially positioning the control sleeves by said means for controlling the axial movements of the two control sleeves such that the clutch with the parking brake gear wheel is engaged and the clutch with the housing is open, thus allowing energy stored in said spring means to apply the parking brake; and releasing the parking brake by the service brake actuator providing a parking brake releasing rotation of said gear wheel which simultaneously winds up said spring means such that energy is stored in said spring means for subsequent brake force application, and then axially positioning said control sleeves such that the clutch with the parking brake gear wheel is open and the clutch with the housing is engaged.

11. The method according to claim 10, further comprising, during axial movement of the means for controlling the axial movements of the two control sleeves, engaging both clutches by a spring before either of the clutches is opened, regardless of which direction the axial movement of the means for controlling the axial movements of the two control sleeves has.

12. The method according to claim 10, wherein said means for controlling the axial movements of the two control sleeves is axially movable under the action in a parking brake release direction of a fixed electromagnet and in the opposite direction by a return spring.

13. A vehicle comprising a parking brake arrangement for a service brake actuator, said parking brake arrangement comprising:

a housing;

a spring means for exercising a rotary motion at will on a parking brake gear wheel in drive connection with a device for delivering brake force from the brake unit;

two axially movable control sleeves in drive connection with the spring means and forming clutches with the parking brake gear wheel and the housing, respectively; and means for controlling the axial movements of the two control sleeves and the engagement of the two clutches in such a way that either one of them is always in engagement.

14. A vehicle according to claim 13, wherein the vehicle comprises a rail vehicle.

\* \* \* \* \*